Patented July 31, 1951

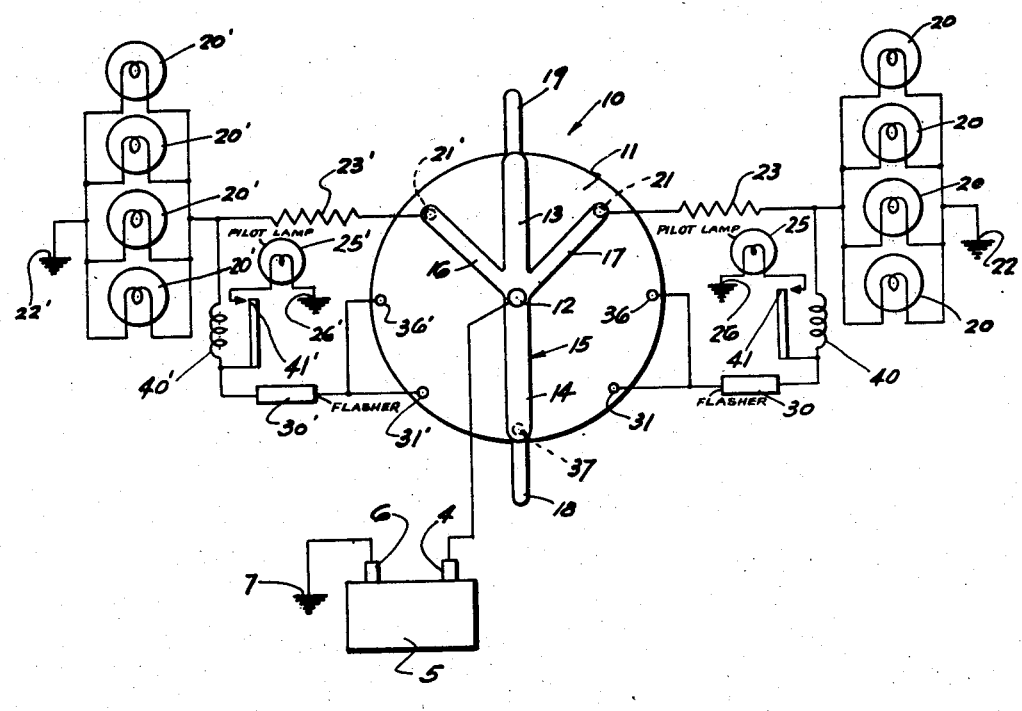

2,562,275

UNITED STATES PATENT OFFICE 2,562,275

SWITCH FOR DIRECTIONAL AND CLEARANCE LAMPS

Jesse R. Hollins, Brooklyn, N. Y.

Application September 17, 1949, Serial No. 116,322

5 Claims. (Cl. 177—329)

This invention relates to vehicle signal systems and, more particularly, to a novel circuit arrangement whereby clearance or marker lamps for a vehicle may be selectively flashingly illuminated, with a much greater brightness than during their steady illumination, to indicate an imminent turning movement of the vehicle.

Larger motor vehicles, such as large trucks, truck-trailer units, inter-urban buses and the like are required to carry clearance lamps on their ends and sides to apprise drivers of other vehicles of their position on the road. Additionally, such vehicles carry directional signal lamps on their front and rear ends to advise of turning movements. This lamp equipment represents a considerable investment and imposes a relatively heavy drain on the vehicle power system.

To reduce the investment in lamps and decrease the power drain, the present invention provides a novel association of circuit elements, and a switch controlling the same, whereby the clearance lamps are utilized as flashing directional signals. In the neutral "night" position of the control switch, the clearance lamps on both sides of the vehicle are steadily illuminated, but at a reduced voltage, through series connected resistances. Movement of the control switch to either the "right turn" or "left turn" position illuminates one set of clearance lamps through a flasher unit shunting the resistance, while the other set remains steadily illuminated through the series resistance. A third position of the control switch illuminates both sets of clearance lamps through the flasher units shunting the series resistances.

Thus, a reduced steady illumination of the clearance lamps is provided for normal night driving, with a much brighter flashing illumination of the clearance lamps being provided to selectively indicate an imminent turning movement. Bright, intermittent illumination of all the clearance lamps is provided to indicate an "emergency stop" for the vehicle. The switch has a reverse position for day driving in which the clearance lamps are normally extinguished and are selectively intermittently illuminated only to indicate a turn.

With the foregoing in mind, it is an object of the present invention to provide a novel vehicle signalling system utilizing clearance lamps for directional signalling.

Another object is to provide such a system in which the clearance lamps may all be steadily illuminated at a reduced voltage, or the two sets may be selectively intermittently illuminated at a higher voltage.

These, and other objects, advantages and novel features of the invention will be apparent from the following description and the accompanying drawing. In the drawing, the single figure is a schematic wiring diagram of a vehicle signalling system incorporating the invention.

The signalling system includes a control switch 10 for selectively or simultaneously energizing parallel connected clearance lamps 20, 20' arranged in two sets, one on either side of the vehicle. Switch 10 may be of the type shown, described and claimed in my U. S. Patent No. 2,514,604 issued July 11, 1950. As shown, it includes an insulating base 11 having a central pivot terminal 12 to which is secured a movable switch member 15. Member 15 has diametrically opposite arms 13, 14 and radial arms 16, 17 extending at an angle to arm 13. Arms 16, 17 are shorter than arms 13, 14 and, in the "night" position of switch 10, as shown, engage contacts 21, 21' connected, respectively, to lamps 20, 20' grounded as at 22, 22'. Contacts 21, 21' are radially closer to terminal 12 than are further contacts 31, 31', 36, 36' and 37.

Resistances 23, 23' are connected in series between contact 21 and lamps 20 and between contact 21' and lamps 20', respectively. With terminal 12 connected to the "live" terminal 4 of the vehicle power source, such as a battery 5 having a terminal 6 grounded as at 7, the clearance lamps 20, 20' are energized through the series connected resistances 23, 23', respectively. Thus, in the switch position shown, both sets of clearance lamps are steadily illuminated, but at a reduced voltage due to resistances 23, 23'.

To advise of a turning movement, for example a right turn, member 15 is moved one position counter-clockwise. Contact 21 is disengaged, arm 13 engages contact 21', and arm 14 engages contact 31. As lamps 20' are still energized through series resistance 23', they continue to be steadily illuminated at a relatively low level. However, lamps 20 are now energized through flasher unit 30 connected between contact 31 and the right hand bank or set of lamps 20. The latter are thus intermittently illuminated at a relatively high level to give a brighter flashing "right turn" signal.

It will be noted that contacts 36, 36' are connected directly to contacts 31, 31', respectively. In the "right turn" portion of member 15, each time flasher unit 30 closes, to energize lamps 20, a relay 40, then in series with lamps 20, closes its contact 41 to illuminate a pilot lamp 25 grounded at 26. When the flasher unit opens to de-energize lamps 20, the current flow through lamp 25 is also interrupted through opening of relay contact 41. Consequently, lamp 25 flashes with lamps 20, if the circuits of the latter are in good order. As relay 40 is in series with lamps 20, failure of one or more lamps 20 reduces the relay current below a value sufficient to close contact 41. The pilot lamp being unlit indicates defective circuit connections.

A "left turn" is signalled in a like manner by moving member 15 one position clockwise. This energizes left side lamps 20' through flasher unit 30', flashing these lamps and pilot or indicator lamp 25'. Right side lamps 20 are steadily illuminated, at the relatively low level, through series resistance 23, whereas lamps 20' are flashed at a relatively high level of illumination.

To warn of an "emergency stop," member 15 is moved two positions in either direction to connect contacts 36, 36' to terminal 12 through arms 13, 14. Both sets of lamps 20, 20' are thus flashed, at a high level of illumination, through flasher units 30, 30' respectively, pilot lamps 25, 25' are also flashed if the circuit connections are in order.

For day driving member 15 is moved 180° so that handle 19 occupies the position of handle 18. As contacts 21, 21' are no longer engaged by member 15, lamps 20, 20' are selectively illuminated through units 30, 30' only to indicate a turn. Handles 18, 19 can be appropriately marked "Day" and "Night," or the switch casing can be similarly marked.

While a specific embodiment of the invention has been shown and described in detail to illustrate the application of the invention principles, it should be understood that the invention may be otherwise embodied without departing from such principles.

What is claimed is:

1. A vehicle signalling system comprising, in combination, a source of power, two sets of clearance lamps, one lamp set arranged on each side of the vehicle, a pair of resistances each connected in series with a different set of clearance lamps, a pair of flasher units each connected in series with a different set of clearance lamps and each in parallel with one of said resistances, and means selectively operable either to simultaneously connect each of said resistances to said source, or to connect the resistance of one lamp set and the flasher unit of the other set to said source, whereby either both sets of lamps may be steadily illuminated at a reduced voltage, or one set may be so steadily illuminated and the other set intermittently illuminated at full voltage to provide a flashing turn indication.

2. A vehicle signalling system comprising, in combination, a source of power, two sets of clearance lamps, one lamp set arranged on each side of the vehicle, a pair of resistances each connected in series with a different set of clearance lamps, a pair of flasher units each connected in series with a different set of clearance lamps and each in parallel with one of said resistances, and means selectively operable either to simultaneously connect each of said resistances to said source, or to connect the resistance of one lamp set and the flasher unit of the other set to said source, or to connect both flasher units simultaneously to said source, whereby, either both sets of lamps may be steadily illuminated at a reduced voltage, or one set may be so steadily illuminated and the other set intermittently illuminated at full voltage to provide a flashing turn indication, or both sets may be intermittently illuminated at full voltage to provide a flashing "emergency stop" signal.

3. A vehicle signalling system comprising, in combination, a source of power, two sets of clearance lamps, one lamp set arranged on each side of the vehicle, a first pair of contacts, a second pair of contacts, a pair of resistances each connected in series between a different contact of said first pair and a different set of said clearance lamps, a pair of flasher units each connected in series between a different contact of said second pair and a different set of clearance lamps and each in parallel with one of said resistances, a pair of pilot lamps, a pair of relays each connected in series between a flasher unit and the associated set of clearance lamps and each operable to energize an associated pilot light when the corresponding flasher unit closes, and means selectively operable either to simultaneously connect both contacts of said first pair, or one contact of said first pair and an opposite contact of said second pair to said source, whereby either both sets of lamps may be steadily illuminated at a reduced voltage, or one set may be so steadily illuminated and the other set intermittently illuminated at full voltage to provide a flashing turn indication, and the pilot lamp of said second set being intermittently illuminated each time the corresponding flasher unit closes its circuit.

4. A vehicle signalling system comprising, in combination, a source of power, two sets of clearance lamps, one lamp set arranged on each side of the vehicle, a first pair of contacts, a second pair of contacts, a pair of resistances each connected in series between a different contact of said first pair and a different set of said clearance lamps, a pair of flasher units each connected in series between a different contact of said second pair and a different set of clearance lamps and each in parallel with one of said resistances, a pair of pilot lamps, a pair of relays each connected in series between a flasher unit and the associated set of clearance lamps and each operable to energize an associated pilot light when the corresponding flasher unit closes, and means selectively operable either to simultaneously connect both contacts of said first pair, or one contact of said first pair and an opposite contact of said second pair to said source, whereby either both sets of lamps may be steadily illuminated at a reduced voltage, or one set may be so steadily illuminated and the other set intermittently illuminated at full voltage to provide a flashing turn indication, and the pilot lamp of said second set being intermittently illuminated each time the corresponding flasher unit closes its circuit.

5. A vehicle signalling system comprising, in combination, a source of power, two sets of clearance lamps, one lamp set arranged on each side of the vehicle, a first pair of contacts, a second pair of contacts, a third pair of contacts, each contact of said third pair being connected to a different contact of said second pair, a pair of resistances each connected in series between a different contact of said first pair and a different set of said clearance lamps, a pair of flasher units each connected in series between a different contact of said second pair and a different set of clearance lamps and each in parallel with one of said resistances, a pair of pilot lamps, a pair of relays each connected in series between a flasher unit and the associated set of clearance lamps and each operable to energize an associated pilot light when the corresponding flasher unit closes, and means selectively operable either to simultaneously connect both contacts of said first pair, or one contact of said first pair and an opposite contact of said second pair, or both contacts of said third pair, to said source, whereby either both sets of lamps may be steadily illuminated at a reduced voltage, or one set may be so steadily illuminated and the other set intermittently illuminated at full voltage to provide a flashing turn indication and the pilot lamp of said second set being intermittently illuminated each time the corresponding flasher unit closes its circuit, or both sets may be intermittently illuminated at full voltage to provide a flashing "emergency stop" signal and the pilot lamps of both sets being intermittently illuminated each time the corresponding flasher unit closes its circuit.

JESSE R. HOLLINS.

REFERENCES CITED

The following references are of record in the file of this patent:

UNITED STATES PATENTS

| Number | Name | Date |
| --- | --- | --- |
| 1,740,777 | Murray | Dec. 24, 1929 |
| 2,090,332 | O'Neil | Aug. 17, 1937 |
| 2,122,508 | Bell | July 5, 1938 |
| 2,124,829 | Rioux | July 26, 1938 |